INVENTOR,
Francis Finnegan,
BY
James P. McAndrews
Att'y.

United States Patent Office 3,531,707
Patented Sept. 29, 1970

3,531,707
BATTERY CHARGER AND CHARGE TERMINATOR
Francis Finnegan, Wrentham, Mass., assignor to Texas Instruments Incorporated, Dallas, Tex., a corporation of Delaware
Filed Nov. 28, 1967, Ser. No. 686,210
Int. Cl. H02j 7/04
U.S. Cl. 320—43                          3 Claims

ABSTRACT OF THE DISCLOSURE

A device for charging a battery and for automatically terminating charging when the battery has been charged to a selected potential is shown to incorporate a constant current charging source, a manually operable relay including normally closed contacts in series between the charging source and a battery to be charged and trip coil means adapted to automatically open the relay contacts to terminate charging of the battery in response to a selected current through the trip coil means, transistor means arranged in series with the trip coil means and charging source for controlling current in the trip coil means, Zener diode means regulating the transistor means in response to charging source potential for permitting sufficient current to flow into the trip coil means to automatically open the switch contacts when the battery is charged to the desired battery potential, and a diode interposed between the trip coil means and charging source and the battery for permitting current flow from the charging source to the battery and preventing current flow from the battery through the trip coil means. The relay means are adapted to latch the relay contacts in open circuit position until the contacts are manually reclosed. Preferably, variable resistor means are interposed between the Zener diode and transistor means for adjusting the charge level at which battery charging is terminated. A battery charge terminator connectable to a constant-current charging source and to a battery to be charged is also shown.

---

Figure 1:
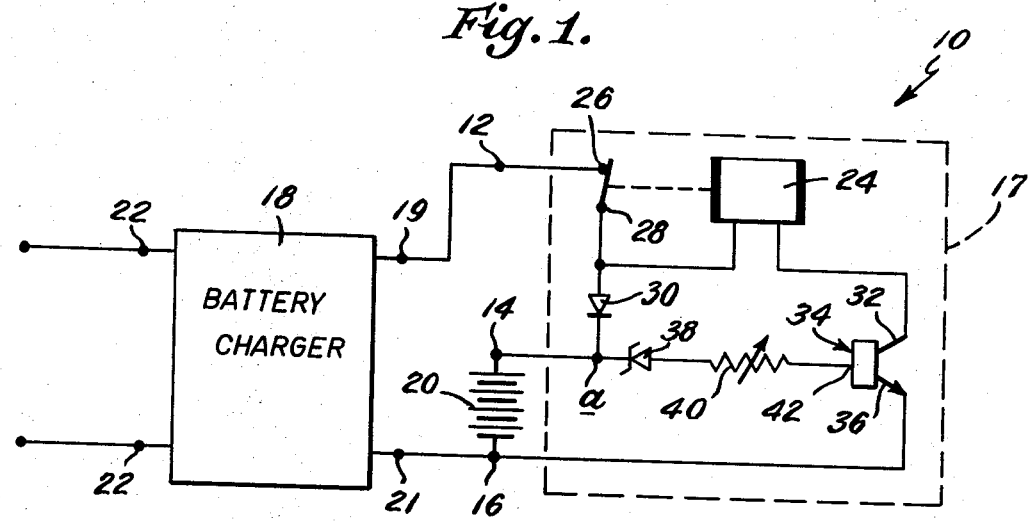

In charging secondary batteries, it is desirable to fully charge the batteries while substantially avoiding overcharging of the batteries. This is particularly important where the batteries are partially or completely sealed so that the excessive gassing which tends to occur during rapid overcharge can be avoided. Various devices proposed for this purpose in the prior art have been expensive or have failed to properly terminate battery charging at the desired battery potential.

It is an object of this invention to provide a novel and improved battery charger which automatically terminates battery charging when the battery has been charged to a selected level; to provide such a battery charger which terminates battery charging only when the battery has been charged to precisely the desired charge level; to provide such a battery charger which is easily adjusted to terminate charging of a battery at any charge level within a selected range; to provide such a battery charger which is of simple and inexpensive construction; and to provide such a battery charger which is easily used by unskilled operators. It is also an object of this invention to provide a battery charge terminator which is connectable to a conventional constant-current charging source and to a battery for charging said battery to a selected charge level.

Briefly described, the novel and improved battery charger of this invention includes a conventional constant-current charging source which is adapted to supply constant charging current at a gradually increasing charging potential until the battery has been charged to the desired charge level as indicated by the level of the battery potential. In accordance with this invention, this charging source is connected in series with the battery to be charged through normally closed contacts of a manually operable relay, the relay including a trip coil which is adapted to open the relay contacts automatically to terminate battery charging in response to selected current in the trip coil. The relay includes means releasably latching the relay contacts in open position. The trip coil is connected in series with a transistor which normally permits insufficient current flow through the coil to open the relay contacts. In addition, a Zener diode is connected between the charging source and the transistor to regulate the transistor. That is, during charging of the battery to the desired charge level, the Zener diode is normally nonconductive and regulates the transistor to prevent sufficient current flow in the trip coil to open the relay contacts. However, when the charging potential increases as the battery becomes charged to the desired charge level, the Zener diode becomes conductive regulating the transistor to permit sufficient current flow in the trip coil to open the relay contacts and to automatically terminate battery charging. A diode interposed between the battery on the one hand and the charging source and trip coil on the other hand permits charging of the battery through the diode while preventing current from the battery through the trip coil after charging of the battery has been terminated. Preferably, variable resistor means are interposed between the Zener diode and transistor for adjusting the rate at which current in the trip coil increases with increase in charging source potential after exceeding the Zener diode operating potential.

Figure 2:
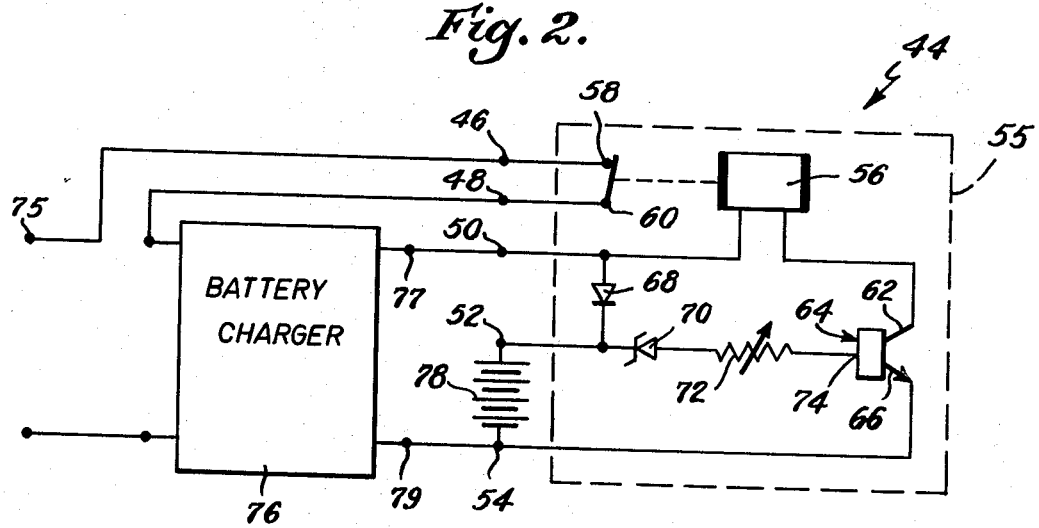

Other objects, advantages and details of the battery charger of this invention appear in the following detailed description of preferred embodiments of this invention, this description referring to the drawings in which FIGS. 1–2 illustrate respective preferred embodiments of the charge terminator of this invention.

Referring to FIG. 1 of the drawings, a preferred embodiment of the battery charging terminator 10 of this invention is shown to include three terminals 12, 14 and 16, mounted on an insulating base or housing of any conventional design diagrammatically illustrated at 17, for use in conjunction with a constant-current charging source 18 to charge a battery 20. The charging source can comprise any conventional constant-current charger and is therefore not further described herein, it being understood that the charger is adapted to be connected to any available 110 volt alternating current source as is diagrammatically indicated in FIG. 1 by the line terminals 22 and that the charger is adapted to furnish electrical charging energy to the battery 20 at a constant current and at a gradually increasing charging potential as the battery terminal voltage increases during charging thereof.

Within the terminator 10, a manually and magnetically operable relay means of any conventional type, including relay coil means 24 and normally-closed fixed and movable relay contacts 26 and 28 respectively, is arranged with the relay contacts connected in series between the terminals 12 and 14 of the terminator. The relay means are of any conventional type including means releasably latching the relay contacts so that the contacts, once opened, are latched open until manually reclosed. A diode 30 is preferably interposed between the relay contacts and the terminal 14 as shown. The relay contact 28 is also connected through the relay coil means 24 to the collector 32 of a transistor 34, the transistor emitter 36 being connected to the terminator terminal 16 as shown. In addition, a Zener diode 38 and a variable resistor 40 are connected between the terminator terminal 14 and the base 42 of the transistor.

In accordance with this invention, the noted terminator components are selected so that, when the terminator terminals 12 and 16 are connected to respective positive and negative charging terminals 19 and 21 of the battery charger 18 and when the positive and negative terminals of the battery 20, in discharged condition, are connected to the terminator terminals 14 and 16 respectively, neither the Zener diode nor the transistor 34 conducts substantially so that insufficient current flows from the charging source through the relay coil means 24 to actuate the relay for opening the relay contacts. Therefore as the battery is connected across the noted terminals, battery charging is initiated and current flows through the diode 30 for charging the battery. However, the noted terminator components are selected so that, as the battery charge level increases so that battery terminal voltage increases, the potential at point $a$ increases toward the breakdown voltage of the Zener diode. Then, when battery terminal voltage has increased to a sufficient level, the Zener diode becomes conductive, current flowing through the Zener diode then rendering the transistor conductive to permit current to flow from the charging source through the relay coil means as will be understood. As current flow through the Zener diode is additionally limited by the resistor 40, the transistor does not permit sufficient current flow through the relay coil means to actuate the relay as soon as the Zener diode becomes conductive. However, as battery terminal voltage increases above the Zener breakdown voltage to the level reflecting fully charged battery condition, current flow through the resistor further increases to permit sufficient current to flow through the transistor and relay coil means to actuate the relay and to open the relay contacts for terminating battery charging. As will be understood, the increase in current through the resistor 40 for regulating operation of the transistor is not linearly related to the increase in battery terminal voltage due to the presence of the Zener diode. As a result, the small increase in battery terminal voltage occurring as the battery is brought to fully charged condition is more than adequate to effect actuation of the relay for opening the relay contacts.

If, while the battery is in fully charged condition, the battery is permitted to remain connected in the terminator as shown, the diode 30 prevents leakage of current from the battery through the relay coil means and maintains the battery in fully charged condition. Similarly, if the relay means is manually closed while the battery is connected in the terminator in fully charged condition, sufficient current immediately flows through the relay coil means for opening the relay contact to immediately terminate battery charging. If, however, the relay is manually closed after the fully charged battery is replaced with a second battery in discharged condition, the terminator immediately initiates charging of the second battery in the manner above described.

For example, where the terminator above described is to be used in charging a silver-cadmium battery which has a battery terminal voltage of 4.8 volts in fully charged condition, the Zener diode 38 is selected to have a breakdown voltage of 3.3 volts. The variable resistor 40 preferably comprises a rheostat variable in resistance from 100 to 1000 ohms resistance. When the battery is initially connected to the terminator in the manner described above, the battery terminal voltage may be greater or lesser than 3.3 volts depending upon the charge condition of the battery. When connected into the terminator, charging of the battery is immediately initiated and, when battery terminal voltage is or becomes greater than 3.3 volts, the Zener diode 38 becomes conductive for providing a regulating current to the transistor 34. When battery terminal voltage increases to 4.8 volts for reflecting fully charged battery condition, current flow through the Zener diode is sufficient to actuate the relay for terminating battery charging. If the battery is to be charged to a higher terminal voltage, the resistor 40 is varied so that the signal supplied to the transistor 34 becomes sufficient to cause actuation of the relay only when the battery terminal voltage reaches the desired voltage greater than 4.8 volts. In a practical embodiment of such a charge terminator, the relay coil requires a current of 100 to 125 milliamperes to open the relay contacts and the transistor 34 comprises a silicon transistor sold by Texas Instruments Incorporated of Dallas, Tex., under Cat. No. 2N3704, such a transistor having uniform performance characteristics over the temperature range to which the charge terminator is likely to be subjected.

In an alternative embodiment of this invention, a terminator 44 is provided with five terminals 46, 48, 50, 52 and 54 mounted on a base diagrammatically indicated at 55 in FIG. 2. A manually and magnetically operable relay means, including a relay coil means 56 and normally-closed fixed and movable relay contacts 58 and 60, is arranged with the relay contacts connected in series between the terminator contacts 46 and 48. The relay coil means is connected in series between the terminator terminal 50 and the collector 62 of the transistor 64, the transistor emitter 66 being connected to the terminator terminal 54. In addition, a diode 68 is connected between the terminator terminals 50 and 52, and a Zener diode 70 is connected in series with a variable resistor 72 between the terminator terminal 52 and the base 74 of the transistor.

When the terminator terminals 46 and 48 are connected in series between one terminal 75 of an alternating current source and one side of a conventional constant-current battery charger 76 as shown, when the terminator terminals 50 and 54 are connected to respective positive and negative charging terminals 77 and 79 of the constant-current charger, and when the positive and negative terminals of a battery 78, in discharged condition, are connected to the terminator terminals 52 and 54 respectively as in FIG. 2, the terminator is adapted to operate in the manner similar to the terminator 10 above described. That is, when the battery is initially connected in the terminator, charging of the battery is immediately initiated by current flow from the charger through the diode 68 for charging the battery. At this point, the Zener diode 70 and transistor 64 are not conducting or conduct too little current to permit actuation of the terminator relay. However, as the battery is charged and displays increasing battery terminal voltage, the Zener diode conducts and regulates the transistor to permit additional current flow through the relay coil means. When battery terminal voltage reflects a fully charged battery condition, current flow through the relay coil means becomes sufficient to actuate the terminator relay to terminate charging of the battery.

It can be seen that the battery charge terminators provided by this invention are easily adapted to terminate charging of a battery only when the battery has been charged to precisely the desired charge level. The charge terminating devices are also easily adjusted to terminate charging of the battery at any charge level within a selected range. The terminators are also of simple and inexpensive construction and are adapted to be easily used by unskilled operators.

Although the battery charge terminators 10 and 44 of this invention have been described as being connectable to a constant-current charging source, it will be understood that such a charging source can be combined with one of said terminators in the manner described to form a battery charger unit within the scope of this invention.

Although particular embodiments of the battery charge terminators of this invention have been described by way of illustration, this invention includes all modifications and equivalents thereof which fall within the scope of the appended claims.

I claim:
1. A battery charge terminator comprising a base; first and second terminals mounted on said base for con- nection to respective charging terminals of a constant-current charging means; a third terminal mounted on said base for connection with said second terminal to respective terminals of a battery; normally-closed relay contacts connected in series between said first and third terminals for charging said battery; a diode interposed between said relay contacts and third terminal; relay coil means connected in series between said relay contacts and second terminal to be energized for opening said relay contacts to terminate charging of said battery; means for releasably latching said relay contacts in open position; a transistor having its emitter-collector circuit interposed in series with said relay coil means for normally preventing energization of said relay coil means; variable resistor means; and a Zener diode connected in series with said resistor means between said third terminal and the base of said transistor for regulating conduction by said transistor to energize said relay coil means to open said contacts in response to selected terminal voltage of said battery.

2. A battery charge terminator comprising a base; first and second terminals mounted on said base for connection in series in an alternating current supply line to a constant-current charging source; third and fourth terminals mounted on said base for connection to respective charging terminals of said charging source; a fifth terminal mounted on said base for connection with said fourth terminal to respective terminals of a battery; normally-closed relay contacts connected in series between said first and second terminals for energizing said charging source; a diode connected between said third and fifth terminals for charging said battery; relay coil means connected in series between said third and fourth terminals to be energized for opening said relay contacts to terminate battery charging; means for releasably latching said relay contacts in open position; a transistor having its emitter-collector circuit interposed in series with said coil means for normally preventing energization of said coil means; movable resistor means; and a Zener diode connected in series with said resistor means between said fifth terminal and the base of said transistor for regulating conduction by said transistor to energize said coil means to open said contacts in response to selected terminal voltage of said battery.

3. A battery charge terminator comprising a base, normally closed relay contacts, a diode, means mounted on said base for connecting said diode and normally closed contacts in series with a constant-current charging means and a battery for charging said battery, relay coil means energizable for opening said relay contacts to terminate charging of said battery, means for releasably latching said relay contacts in open position, a transistor having its emitter-collector circuit interposed in series with said relay coil means for normally preventing energization of said relay coil means, variable resistor means, Zener diode means, and means connecting said Zener diode means in series with said resistor means between said battery and the base of said transistor for regulating conduction by said transistor to energize said relay coil means to open said relay contacts in response to selected terminal voltage of said battery.

References Cited
UNITED STATES PATENTS

| | | | |
|---|---|---|---|
| 3,215,922 | 11/1965 | Olsen et al. | 320—40 |
| 3,241,029 | 3/1966 | Slomski | 320—40 |

J D MILLER, Primary Examiner

J. M. GUNTHER, Assistant Examiner

U.S. Cl. X.R.

320—40